Figure 1:
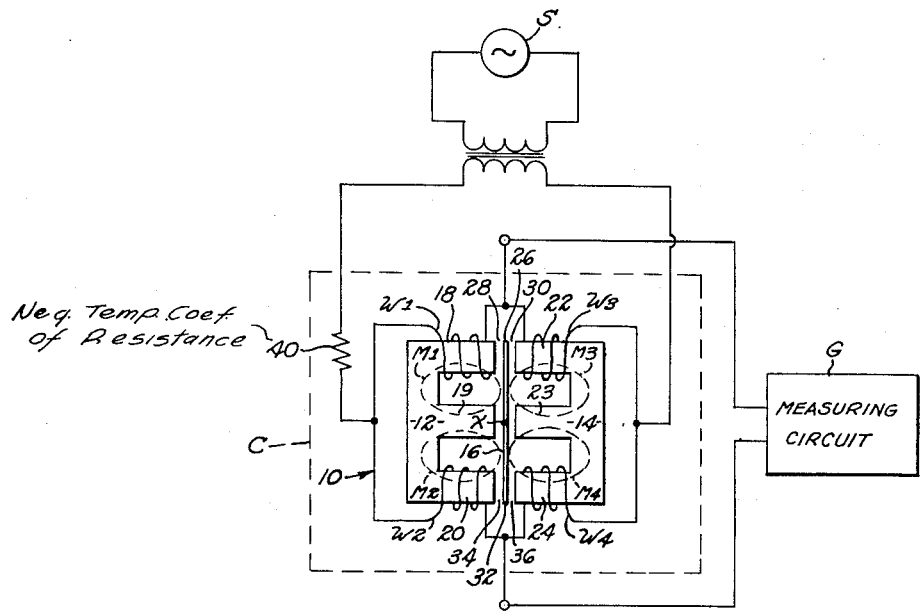

Oct. 27, 1953

T. H. WIANCKO 2,657,353

BRIDGE CIRCUIT

Filed June 25, 1951

INVENTOR.
THOMAS H. WIANCKO
BY
ATTORNEY.

Patented Oct. 27, 1953

2,657,353

UNITED STATES PATENT OFFICE 2,657,353

BRIDGE CIRCUIT

Thomas H. Wiancko, Altadena, Calif.

Application June 25, 1951, Serial No. 233,270

11 Claims. (Cl. 323—75)

My invention relates to improvements in systems for measuring acceleration and other physical data and more particularly to an improved bridge circuit which is accurate over a wide temperature range.

It is quite common to employ a bridge circuit having four arms to measure acceleration or other physical data. For example, accelerometers are available in which the inductances of one or more windings thereof varies with acceleration, and such windings are connected in the various arms of the bridge circuit. Sometimes two such windings are employed, and sometimes four such windings are employed though one or three windings might also be used. In some measuring systems the bridge is operated unbalanced when no acceleration is occurring, thus producing a modulated carrier at the output. In others, the bridge circuit is normally balanced when no acceleration is applied. In both cases a modulated carrier appears at the output when a carrier wave is applied to the input. In both cases, especially the latter, it is highly desirable to produce an output signal that bears a constant-phase relationship with the input signal, preferably of the identical-phase, especially when the input signal and the output signal are to be mixed in some common circuit as is often done.

Usually the windings employed in such accelerometers are composed of a material such as copper having a substantial temperature coefficient of resistance. For this reason, if the temperature of the instrument changes for any reason whatsoever, the resistance of the winding and also the ratios of reactance to resistance of the windings likewise changes. It is often desirable to utilize such instruments over a wide range of temperatures such as from −70° F. to 200° F. Consequently, unless special precautions are taken the percentage modulation of the output signal and the phase of the output signal vary considerably over such temperature range.

I have found that the effect of temperature on the windings may be overcome by connecting a single resistance between the source of carrier wave and the bridge circuit, and by employing an output circuit having a value of resistance determined by the impedance characteristic of the windings. More particularly, I have found that constancy of output both in amplitude and phase may be achieved by employing such a compensating resistance and such a measuring circuit when the accelerometer or other measuring device employs four windings of similar characteristics and the windings are connected in the four arms of a bridge circuit.

Though my invention is described herein only with specific reference to accelerometers of the variable reluctance type, it is to be understood that my invention may be applied to any other device in which the inductance of one or more windings varies with a physical factor that is to be measured.

It is therefore an object of my invention to provide a bridge circuit comprising a variable inductance in which the degree of modulation of the output is independent of the temperature to which the measuring circuit is subjected.

It is another object of my invention to provide a bridge circuit comprising a variable inductance in which the phase of the output is independent of the temperature to which the measuring circuit is subjected.

It is a further object of my invention to provide a bridge circuit comprising a variable inductance in which both the amplitude and the phase of the output is independent of temperature variations of the circuit.

Figure 2:
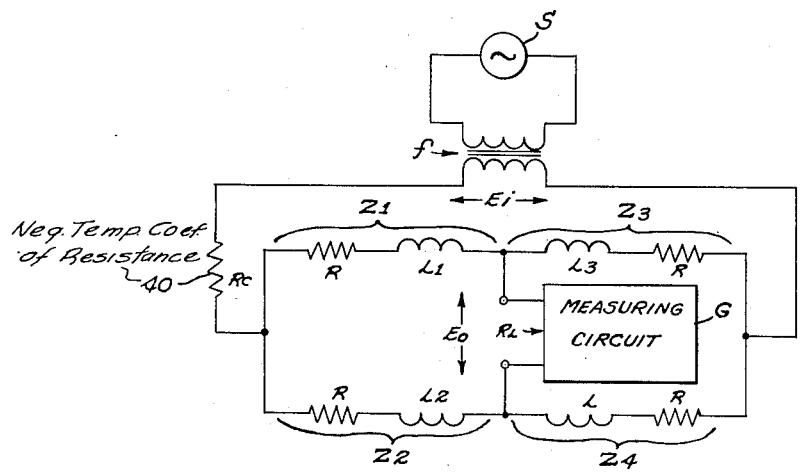

The foregoing and other objects of my invention will best be understood by reference to the following description taken in connection with the accompanying drawing wherein:

Figure 1 is a schematic diagram illustrating the application of my invention to an accelerometer; and Fig. 2 is a schematic wiring diagram also illustrating the same embodiment of my invention.

My invention is illustrated herein with particular reference to its application to a four-arm accelerometer. In particular, referring to Fig. 1, there is illustrated a bridge circuit including windings $W_1$, $W_2$, $W_3$, and $W_4$ of a four-arm accelerometer $10$. The accelerometer there illustrated is of the type described and claimed in my Patent No. 2,618,776, issued November 18, 1952. The accelerometer $10$ comprises two E-shaped magnetic structures $12$ and $14$ having their legs facing each other across a space in which a dynamically unbalanced armature $16$ is mounted, for rotational movement about a pivot axis X. For convenience the accelerometer is described as though mounted with the armature and the E-shaped magnetic structures vertical so that the accelerometer is responsive to horizontal accelerations.

More particularly, the windings $W_1$ and $W_2$ are arranged on the upper and lower legs $18$ and $20$ respectively of the first E-shaped magnetic structure $12$, and the windings $W_3$ and $W_4$ are arranged on the upper and lower legs $22$ and $24$ respectively of the second E-shaped magnetic structure $14$. The two windings $W_1$ and $W_2$ on the first magnetic structure $12$ are so wound that the fluxes therein reinforce each other in the center leg $19$ of this magnetic structure. Similarly, the two windings $W_3$ and $W_4$ on the second magnetic structure $14$ are wound so that the fluxes therein reinforce each other in the center leg $23$ of this magnetic structure. The upper end $26$ of the armature $16$ is located between the faces of the two upper legs 18 and 22 forming therewith two gaps 28 and 30. The lower end 32 of the armature 16 is located between the faces of the two lower legs 20 and 24 forming therewith two gaps 34 and 36. The windings $W_1$ and $W_3$ on the two upper legs 18 and 22 are wound so that their fluxes reinforce each other in the upper end 26 of the armature between the pole tips of these legs. Likewise, the windings $W_2$ and $W_4$ on the two lower legs 20 and 24 are wound so that their fluxes reinforce each other in the lower end 32 of the armature between the pole tips of these legs. The armature 16 and the magnetic structures 12 and 14 are all composed of soft ferro-magnetic material. In effect, four magnetic circuits $M_1$, $M_2$, $M_3$ and $M_4$ are formed, being linked respectively with the four windings $W_1$, $W_2$, $W_3$ and $W_4$.

As explained in my said copending patent application, the armature 16 is dynamically unbalanced so that, when the accelerometer 10 vibrates along a predetermined axis, the armature 16 rotates about its pivot axis X. When this occurs the thickness of gaps 28 and 36 change in one direction (e. g. increase) while the thickness of gaps 30 and 34 change in the opposite direction (e. g. decrease) varying the reluctances of the magnetic circuits and hence the self-inductances of the four windings $W_1$, $W_2$, $W_3$ and $W_4$. In practice, the entire arrangement is designed with four-fold symmetry about the pivot axis and the windings $W_1$, $W_2$, $W_3$ and $W_4$ all contain the same number of turns. Consequently, when the armature 16 is in its neutral position, it is symmetrically located between the two E-shaped magnetic structures 12 and 14 and the impedances of all four windings are equal. But when the armature 16 moves from this position the self-inductances of two diametrically opposed windings $W_1$ and $W_4$ vary in one direction (e. g. increase) but remain equal to each other while the inductances of the remaining diametrically opposed windings $W_2$ and $W_3$ vary in the other direction (e. g. decrease) but also remain equal to each other.

The four windings are all connected in a bridge circuit in the manner illustrated both in Figs. 1 and 2. In Fig. 2, however, each of the windings $W_1$, $W_2$, $W_3$ and $W_4$ is represented by its corresponding impedance as $Z_1$, $Z_2$, $Z_3$ and $Z_4$. The electrical positions of the windings $W_1$, $W_2$, $W_3$ and $W_4$ in the bridge circuit are similar to their geometrical or physical positions in the accelerometer 10, the geometrically adjacent windings being in adjacent arms of the bridge circuit and the diametrically opposed windings being in diagonally opposing arms of the bridge circuit.

A source S supplying a constant voltage carrier wave of frequency $f$ is connected across one diagonal of the bridge circuit. A measuring circuit G having an input resistance of value $R_L$ is connected across the other diagonal of the bridge circuit. Thus, the windings $W_1$ and $W_3$ are connected in adjacent arms of one branch of the bridge circuit and the windings $W_2$ and $W_4$ are connected in adjacent arms of the other branch of the bridge circuit. Also, the windings $W_1$ and $W_2$ are in adjacent arms of different branches of the bridge circuit and the windings $W_3$ and $W_4$ are in adjacent arms of different branches of the bridge circuit.

From the foregoing it is apparent that, as the armature 16 rotates, the impedance $Z_1$ of the first winding $W_1$ is always equal to the impedance $Z_4$ of the fourth winding $W_4$. Likewise, as the armature 16 rotates, the impedance $Z_2$ of the second winding $W_2$ is always equal to the impedance $Z_3$ of the third winding $W_3$. The resistance of each of the windings is equal to the same value R at all times, the inductances of the diametrically opposite two windings $W_1$ and $W_4$ is equal to the same value $L_1$, and the inductances of the other diametrically opposite two windings is $L_2$. Thus, at all times whether or not the accelerometer is vibrating $$Z_1 = Z_4 = R + j\omega L_1 \quad (1)$$
$$Z_2 = Z_3 = R + j\omega L_2 \quad (2)$$

where $$\omega = 2\pi f \quad (3)$$

As the armature 16 rotates, the changes occurring in the inductances $L_1$ and $L_4$ of the two windings $W_1$ and $W_4$ are equal and opposite to the changes occurring in the inductances $L_2$ and $L_3$. Thus, as the accelerometer 10 vibrates, an amplitude-modulated carrier wave appears at the output of the bridge circuit.

If for any reason the temperature of the windings of the accelerometer 10 changes, the values of the resistances of the windings also change, at least if the windings are made of any ordinary material such as copper which has a positive temperature coefficient of resistance. By virtue of such variations in the value of the resistances of the windings, both the amplitude and the phase of the output wave vary with temperature for any particular position of the armature 16, thereby rendering the measurements of the output unreliable.

According to my invention errors that would otherwise occur because of temperature variations in the accelerometer are eliminated by connecting a compensating resistor 40 having a value $R_c$ in one of the leads between the source S and the input terminals of the bridge. The resistor 40 is composed of a material characterized by a negative temperature coefficient of resistance $K_c$ and is of such a value that the output signal remains constant both in amplitude and in phase regardless of temperature variations of the windings. To achieve this result the resistor 40 is mounted in the same case C as the windings $W_1$, $W_2$, $W_3$ and $W_4$ and, in fact, is even immersed in the fluid employed for damping the vibrations of the armature all as more fully described in my said copending patent application. Thus, the compensating resistor is maintained at the same temperature as the windings $W_1$, $W_2$, $W_3$ and $W_4$.

With this arrangement it can be shown that the ratio of the output voltage $E_o$ to the input voltage $E_i$ is represented by the equation $$\frac{E_o}{E_i} = \frac{j\omega}{2} \frac{L_2 - L_1}{R_c + R + j\omega\left(\frac{L_1 + L_2}{2}\right)} \quad (4)$$

More particularly the ratio of the output voltage to the input voltage is made independent of temperature variations by selecting the value $R_c$ of the compensating resistor in accordance with the following equation $$R_c K_c = -RK \quad (5)$$

where $K$ = fractional change /°F. in resistance of material of which the windings $W_1$, $W_2$, $W_3$ and $W_4$ are made, and $K_c$ = fractional change /°F. in resistance of the material of which the compensating resistor $R_c$ is composed.

If the instrument is to be employed over only small temperature range the values of K and $K_c$ may be considered substantially constant. But if the instrument is to be employed over a wide temperature range, the values of K and $K_c$ may vary considerably. In this case, best results are obtained by employing a compensating resistor network for which Equation 5 is satisfied at all temperatures throughout the temperature range in question. As is well known in the art, such a network may be made by combining one or more negative temperature coefficient resistors with one or more other resistors having either positive or zero temperature coefficients.

Suitable negative temperature coefficient materials are readily available commercially. Such materials comprise, for example, many of the rare earth oxides.

It is not only desirable to maintain the amplitude and phase of the output voltage independent of temperature but it is also desirable to have the output voltage remain in phase with the input voltage. I have found that identity of phase between the output voltage and the input voltage can be achieved if the resistance $R_L$ looking into the measuring circuit satisfies the following equation approximately $$R_L = \frac{1}{R_c+R} \frac{\omega^2}{4}(L_1+L_2)^2 - R \qquad (6)$$

Furthermore, I have found that the amplitude of the output voltage for such identical phase operation may be maintained substantially independent of temperature variations if the load resistance $R_L$ is large compared with the variations in the resistance of the windings $W_1$, $W_2$, $W_3$ and $W_4$ over the range of temperature to which the accelerometer is subjected in use. In other words, the output voltage may be maintained independent of the temperature provided that the following relationship is satisfied $$R_L \gg R K \Delta T \qquad (7)$$

where $\Delta T$ represents the temperature range over which the instrument is used.

In a particular accelerometer to which my invention has been applied the values of the resistance and the inductances with the bridge balanced were $R = 450$ ohms
$R_c = 450$ ohms
$\omega L_1 = \omega L_2 = 3750$ ohms when employed in a bridge to which a carrier wave having a frequency of 400 C. P. S. was applied. In this particular case it was found that the desired identity of the phase of the output voltage and the input voltage was achieved when $R_L = 15,000$ ohms approximately.

With this value the output voltage was also independent of temperature over any temperature range $\Delta T$ likely to be encountered under atmospheric conditions.

Best results are obtained by employing a resistor at the input of the measuring circuit composed of a material having a zero temperature coefficient of resistance.

In practice, the resistance R may not be a constant at any given temperature but may vary with frequency and may even vary with the amplitude of vibration. Though my invention is most effective at low frequencies where R does not vary in such a way, some of the benefits of my invention may nevertheless be obtained at higher frequencies, especially if the part of the A. C. resistance due to copper losses remains large compared with part of the A. C. resistance due to eddy current loss.

It is to be noted that the phase of the output is identical with the phase of the input if the output load resistance satisfies Equation 6 above even if the instrument is always operated at the same temperature or if the resistances in the arms of the bridge are independent of temperature.

From the foregoing explanation, it will be clear that I have provided a bridge circuit in which the output for a given acceleration is independent of the temperature to which the bridge circuit is subjected. In the case of an accelerometer, the inductances of the windings is varied in accordance with acceleration to be measured by mounting the case of the accelerometer in firm contact with the accelerating object. It will be understood, of course, that to measure any other factor the means for varying the inductance in accordance with that factor may comprise a linkage connected to the armature. Other means for moving an armature to vary the inductances will readily occur to those skilled in the art.

Furthermore, though I have described my invention only as applied to a four-winding accelerometer, it is clear that it may also be applied to other accelerometers. For example, if an accelerometer is employed utilizing only a single E-shaped magnetic structure of the type shown in Fig. 1, then the desired phase of the output signal and complete compensation for variations in temperature may be obtained in accordance with the foregoing teachings by connecting the two windings on that magnetic structure in adjacent arms of one branch of a bridge circuit and connecting two auxiliary windings of equal value in the arms of the other branch of the bridge circuit, the two auxiliary windings each having the same Q as the variable reluctance windings. In this particular instance when all four windings and the compensating resistor are exposed to the same temperature, the effect so far as temperature compensation is concerned is just the same as that hereinabove described, though the sensitivity of the system is reduced by one-half. Furthermore, it will be understood that my invention can be extended to other bridge circuit arrangements in which one or more variable inductances are included.

Although only one particular form of my invention has been specifically disclosed, it will therefore be obvious that my invention is not limited thereto but is capable of a wide variety of mechanical and electrical embodiments. Various changes which will now suggest themselves to those skilled in the art may be made in the material, form, detail of construction and arrangements of the elements without departing from the spirit of my invention. Reference is therefore made to the appended claims for a definition of my invention.

I claim:

1. In combination: an alternating current bridge circuit having an input and an output arranged in opposite diagonals thereof and comprising a variable inductive winding in at least one arm thereof, said winding having an electrical resistance that varies with temperature, the inductance of said winding varying in accordance with a force to be measured; a compensating resistor connected to said input, said resistor having a resistance that also varies with temperature; and means for maintaining the temperature of said compensating resistor the same as the temperature of said winding, the temperature coefficients of resistance of said winding and said resistor being of opposite signs, the resistance of said resistor being so proportioned with respect to the resistance of said winding and said temperature coefficients that the changes in resistances of said winding and the changes in resistances of said resistor are such that the degree of modulation of said output is independent of temperature.

2. In combination: an alternating current bridge circuit having an input and an output arranged in opposite diagonals thereof; two inductive windings in opposing arms of said bridge, said windings having equal electrical resistances R composed of a material characterized by a positive temperature coefficient of resistance K, the inductances of said windings varying in accordance with a force to be measured, said windings being so connected in the arms of the bridge as to produce an amplitude-modulated carrier wave between said output terminals when a carrier wave is applied to the input terminals; and a compensating resistor connected in series with said input, said resistor having a resistance $R_c$ and composed of a material characterized by a negative temperature coefficient of resistance $K_c$, the temperature of said windings and said resistor varying together, the value of said resistor being related to the resistances of said windings by the equation $R_cK_c = -RK$ whereby the degree of modulation of said output is independent of temperature.

3. In combination: an alternating current bridge circuit comprising four arms and having an input and an output arranged in different diagonal positions between said four arms; means connected to said input through a pair of leads for impressing a carrier wave thereon; four inductive windings connected in the respective arms of said bridge, said windings having equal electrical resistances R and being composed of a material characterized by a positive temperature coefficient of resistance K, the inductances of said windings varying in accordance with a force to be measured, said windings being so connected in the arms of the bridge as to produce an amplitude-modulated carrier wave between said output terminals when a carrier wave is applied to the input terminals; a compensating resistor connected in one of said leads, said resistor having a resistance $R_c$ and composed of a material characterized by a negative temperature coefficient of resistance $K_c$, the resistance of said resistor being related to the resistances of said windings by the equation $R_cK_c = -RK$; and means for maintaining the temperature of said compensating resistor the same as the temperature of said windings whereby the degree of modulation of said output is independent of temperature.

4. In combination: an alternating current bridge circuit comprising four arms and having an input and an output arranged in different diagonal positions between said four arms; four inductive windings connected in the respective arms of said bridge circuit, said windings being composed of a material the electrical resistance of which varies with temperature in one direction, the inductances of said windings varying in accordance with a factor to be measured, said windings being so connected in the arms of the bridge as to produce an amplitude-modulated carrier wave in said output terminals when a carrier wave is applied to said input; a compensating resistor connected in series with said input, said resistor being composed of a material that varies in having a resistance that varies with temperature in the opposite direction; means for maintaining the temperature of said compensating resistor the same as the temperature of said windings, the resistance of said resistor being so proportioned with respect to the resistances of said winding and said temperature coefficients that the changes in resistances of said winding and the changes in resistance of said resistor are such that the degree of modulation of said output is independent of temperature; and a load resistor connected across said output, said load resistor having a resistance $R_L$ large compared with the changes in value of resistance expected in the range of temperatures over which the bridge is to be used, the value of the resistance of said load resistor being so proportioned in relationship to the resistances and inductances of said windings as to render the phase of said output carrier wave the same as the phase of the input carrier wave.

5. In combination: an alternating current bridge circuit comprising four arms and having an input and an output arranged in different diagonal positions between said four arms; four inductive windings connected in the respective arms of said bridge circuit, said windings having equal electrical resistances R composed of a material characterized by a positive temperature coefficient of resistance K, the inductances of said windings varying in accordance with a factor to be measured, said windings being so connected in the arms of the bridge as to produce an amplitude-modulated carrier wave between said output terminals; means connected to said input through a pair of leads for impressing a carrier wave thereon, said carrier wave having a frequency $f$; a compensating resistor connected in one of said leads, said resistor having a resistance $R_c$ and being composed of a material characterized by a negative temperature coefficient of resistance $K_c$; means for maintaining the temperature of said compensating resistor the same as the temperature of said windings, the resistance of said resistor being related to the resistances of said windings by the equation $R_cK_c = -RK$ whereby the degree of modulation of said output and the phase relationship between said input carrier wave and said output carrier wave is independent of temperature; and a load resistor connected across said output, said load resistor having a resistance $R_L$ large compared with the changes in value of resistance R expected in the range of temperatures over which the bridge is to be used, the value of the resistance of said load resistor approximating $$R_L = \frac{1}{R_c + R} \frac{\omega^2}{4}(L_1 + L_2)^2 - R$$

where $\omega = 2\pi f$ $L_1$ = inductance of each of the two windings in one pair of opposing arms of the bridge circuit and $L_2$ = inductance of each of the other two windings.

6. In combination: an alternating current bridge circuit comprising four arms and having an input and an output arranged in different diagonal positions between said four arms; four inductive windings connected in the respective opposing arms of said bridge circuit; said windings being composed of a material the electrical resistance of which varies with temperature, the inductances of said windings varying in accordance with a force to be measured, said windings being so connected in the arms of the bridge as to produce an amplitude-modulated carrier wave in said output when a carrier wave is applied to said input terminals; and a load resistor connected across said output, the value of the resistance of said load resistor being so proportioned in relationship to the resistances and inductances of said windings as to render the phase of said output carrier wave the same as the phase of the input carrier wave.

7. In combination: an alternating current bridge circuit comprising four arms and having an input and an output arranged in different diagonal positions between said four arms; four inductive windings connected in the respective opposing arms of said bridge circuit; said windings having equal electrical resistances R, the inductances of said windings varying in accordance with a force to be measured, said windings being so connected in the arms of the bridge as to produce an amplitude-modulated carrier wave between said output terminals; means including a voltage source in series with a resistor $R_c$ for impressing a carrier wave across said input, said carrier wave having a frequency $f$; and a load resistor connected across said output, said load resistor having a resistance $R_L$ the value of which approximates $$R_L = \frac{1}{R_c + R} \frac{\omega^2}{4}(L_1 + L_2)^2 - R$$

where $\omega = 2\pi f$ $L_1$ = the inductances of each of the two windings in one pair of opposing arms of the bridge circuit $L_2$ = inductance of each of the other two windings.

8. In combination: an alternating current bridge circuit comprising four arms and having an input and an output arranged in different diagonal positions between said four arms; four inductive windings connected in the respective arms of said bridge circuit, said windings being composed of a material the electrical resistance of which varies with temperature; means controlled by a factor to be measured for varying the inductances of one pair of windings in opposite arms of the bridge equally in one direction and the inductances of the pair of windings in the other opposite arms of the bridge equally in the other direction thereby unbalancing the bridge to produce an amplitude-modulated carrier wave in said output when a carrier wave of constant amplitude is applied to said input; a compensating resistor connected in said input, said resistor being composed of a material having a resistance that varies with temperature; and means for maintaining the temperature of said compensating resistor the same as the temperature of said windings, the change in resistance of said compensating resistor compensating for the changes in resistances of said windings whereby the degree of modulation of said output is independent of temperature.

9. In combination with the apparatus defined in claim 8, a load resistor connected across said output, said load resistor having a resistance $R_L$ large compared with the changes in value of resistance expected in the range of temperatures over which the bridge is to be used, the value of the resistance of said load resistor being so proportioned in relationship to the resistances and inductances of said windings as to render the phase of said output carrier wave the same as the phase of the input carrier wave.

10. In combination: an alternating current bridge circuit comprising four arms and having an input and an output arranged in different diagonal positions between said four arms; four inductive windings connected in the respective arms of said bridge circuit, said windings being composed of a material the electrical resistance of which varies with temperature in one direction; means controlled by a factor to be measured for varying the inductances of one pair of windings in opposite arms of the bridge equally in one direction and the inductances of the pair of windings in the other opposite arms of the bridge equally in the other direction, thereby unbalancing the bridge to produce an amplitude-modulated carrier wave in said output when a carrier wave of constant amplitude is applied to said input; a compensating resistor connected in series with said input, said resistor being composed of a material having a resistance that varies with temperature in the opposite direction; and means for maintaining the temperature of said compensating resistor the same as the temperature of said windings, the resistance of said resistor being so proportioned with respect to the resistances of said winding and said temperature coefficients that the changes in resistances of said winding and the changes in resistance of said resistor are such that the degree of modulation of said output is independent of temperature; and a load resistor connected across said output, said load resistor having a resistance $R_L$ large compared with the changes in value of resistance expected in the range of temperatures over which the bridge is to be used, the value of the resistance of said load resistor being so proportioned in relationship to the resistances and inductances of said windings as to render the phase of said output carrier wave the same as the phase of the input carrier wave.

11. In combination: an alternating current bridge circuit comprising four arms and having an input and an output arranged in different diagonal positions between said four arms; four inductive windings connected in the respective arms of said bridge circuit, said windings having equal resistance R and being composed of a material the electrical resistance of which varies with temperature in one direction; the temperature coefficient of resistance being K; means controlled by a factor to be measured for varying the inductances of one pair of windings in opposite arms of the bridge equally in one direction and the inductances of the pair of windings in the other opposite arms of the bridge equally in the other direction, thereby unbalancing the bridge to produce an amplitude-modulated carrier wave in said output when a carrier wave of constant amplitude is applied to said input; means connected to said input through a pair of leads for impressing a carrier wave thereon, said carrier wave having a frequency $f$; a compensating resistor connected in one of said leads, said resistor having a resistance $R_c$ and being composed of a material characterized by a negative temperature coefficient of resistance $K_c$; means for maintaining the temperature of said compensating resistor the same as the temperature of said windings, the resistance of said resistor being related to the resistances of said windings by the equation $R_cK_c=-RK$; and a load resistor connected across said output, said load resistor having a resistance $R_L$ large compared with the changes in value of resistance R expected in the range of temperatures over which the bridge is to be used, the value of the resistance of said load resistor approximating $$R_L=\frac{1}{R_c+R}\frac{\omega^2}{4}(L_1+L_2)^2-R$$

where $\omega=2\pi f$ $L_1$=inductance of each of the two windings in one pair of opposing arms of the bridge circuit and $L_2$=inductance of each of the other two windings, whereby the degree of modulation of said output and the phase relationship between said input carrier wave and said output carrier wave is independent of temperature.

THOMAS H. WIANCKO.

References Cited in the file of this patent

UNITED STATES PATENTS

| Number | Name | Date |
|---|---|---|
| 1,937,394 | Thoresen | Nov. 28, 1933 |
| 2,419,573 | Lawlor | Apr. 29, 1947 |
| 2,465,683 | Griesheimer | Mar. 29, 1949 |
| 2,531,414 | Engvall | Nov. 28, 1950 |
| 2,554,512 | Varian | May 29, 1951 |